Sept. 20, 1960     P. HANSSEN     2,952,889
EXPANDER AND CONTRACTOR ROLL
Filed Oct. 22, 1956
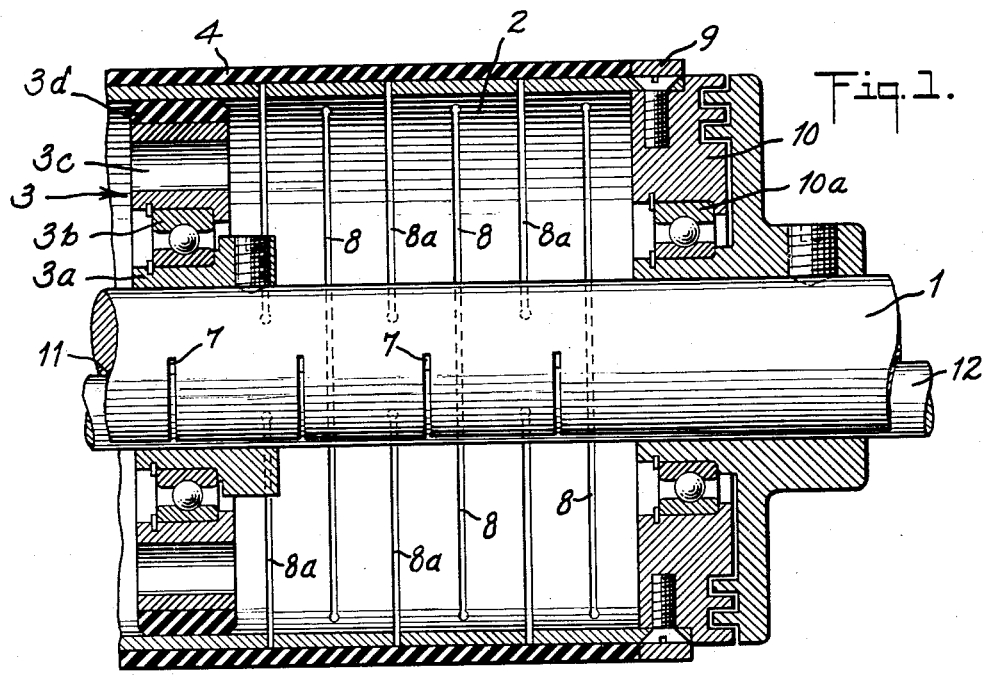
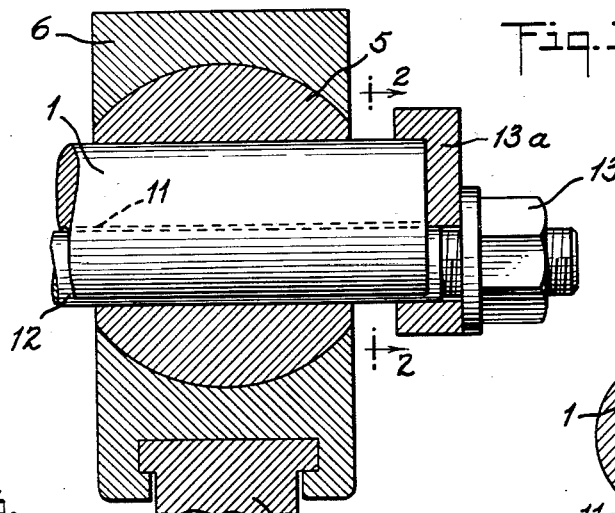
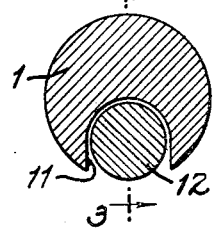
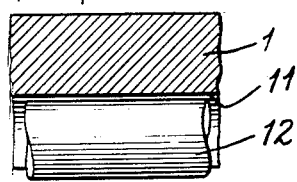
INVENTOR.
PIERRE HANSSEN
BY
ATTORNEY

United States Patent Office 2,952,889
Patented Sept. 20, 1960

2,952,889

EXPANDER AND CONTRACTOR ROLL

Pierre Hanssen, Chemin de la Poudriere, Bischwiller (Bas-Rhin), France

Filed Oct. 22, 1956, Ser. No. 617,332

Claims priority, application France June 30, 1956

2 Claims. (Cl. 26—63)

The present invention relates to a flexible tube, particularly for smoothing rolls, contracting rolls and other rolls and a roll constructed of such a tube.

It is the present practice to smooth or to contract webs of paper, cellophane, films, or other material by means of a longitudinal curved roll which turns freely upon a fixed shaft and the deflection of which roll may be modified by a pulling or releasing action exercised on the said fixed shaft, such as shown, for example, by Patent No. 2,547,975 granted to John D. Robertson on April 10, 1951.

The smoothing or the contraction of the paper webs is obtained by causing the webs to turn around the rolls mounted in the stated manner.

The known unfolding and contracting rolls which are curved comprise generally very complicated and expensive assemblies. One such roll is disclosed in Patent No. 2,393,191 dated January 15, 1946 and includes a series of ball bearings disposed adjacent each other and mounted on a fixed curved shaft and maintained in position by spacers at predetermined spacings. Ball bearings act as the hubs of adjacent pulleys which together support a sleeve of flexible material, for instance, rubber, which constitutes the turning surface of the smoothing or contracting roll. The two ends of the fixed shaft are held in spherical bearings by means which permits a variation of the curvature of the fixed shaft and consequently the sleeve of flexible material, which brings about the smoothing or contraction of the cloth webs.

It is one object of the present invention to provide a flexible tube particularly for smoothing rolls, contracting rolls and other rolls which is preferably made of metal and which replaces advantageously the adjacent pulleys mounted on the ball bearings and serving as supports for a sleeve of flexible material which acts as the turning surface of the smoothing or contracting roll.

It is another object of the present invention to provide a smoothing or contracting roll including a flexible tube as set forth above.

According to the present invention the flexible tube consists of a tube of predetermined outer diameter, of predetermined wall thickness and of appropriate length, which tube is equipped with transversely disposed incisions extending from its circumference to the proximity of its axis. These incisions terminate preferably at each end into a widened portion of circular or other shape. The incisions are preferably equidistant and disposed one after the other at a certain angle, preferably 90°, that is to say that two incisions starting from two diametrically opposed points of the exterior surface of the tube are followed by two incisions starting equally from two diametrically opposed points of the surface, the last mentioned incisions being displaced for an angle of 90° in relation to the first mentioned incisions. Due to these incisions the tube acquires a flexibility which permits the setting of a curvature in accordance to any requirements.

A smoothing and contracting roll constructed with a tube so made, is characterized in that it comprises a fixed shaft formed of a metal bar, ball bearing supports spaced apart from each other and a flexible tube as described above being mounted on these supports, said tube in its turn being enclosed in a sleeve of flexible material which constitutes the turning surface of the roll. The solid metal bar which serves as a fixed shaft on which the roll turns is preferably of round cross section. It contains along a part or along the entire length of the portion thereof in the interior of the flexible tube, transversely disposed incisions which increase notably its flexibility since they start from one side of the bar and extend beyond the axis of the bar. Finally it is also equipped with a slot which extends along its entire length and in which slot is located a draw bolt at the outer ends of which nuts engaging the same permit of modification of the arc of curvature. The fixed shaft is supported in conventional manner by spherical bearings at the ends which permit the assumption of different positions in order to bring about a more or less pronounced curvature of the roll.

With these and other objects in view which will become apparent in the following detailed description, the present invention will be clearly understood in connection with the accompanying drawing, in which:

Figure 1 is an axial or central longitudinal sectional view through one end of a smoothing roll including a flexible tube and a supporting shaft therefor embodying the present invention, the end portion of the shaft being broken away;

Figure 1a is a vertical sectional view of a spherical bearing for one end of the shaft that supports the flexible tube with the end portion of the shaft shown in elevation;

Figure 2 is a fragmentary transverse section of the shaft approximately on the plane of the line 2—2 of Figure 1a; and Figure 3 is a fragmentary vertical longitudinal sectional view on the plane of the line 3—3 of Figure 2.

Referring now to the drawings, the present device comprises a fixed shaft 1, a flexible tube 2, ball bearing supports 3, a sleeve 4 of flexible material slid over the tube 2, and spherical bushings 5 one at each end of the fixed shaft 1 disposed in a bearing member 6 secured on a frame part 6a. For simplicity in illustration only one end of the shaft and the corresponding spherical bearing are shown.

The fixed shaft 1 is a longitudinally curved plain bar of round cross section and is equipped at the portion disposed in the interior of the tube 2 with a plurality of transversely disposed incisions 7 starting from the inner side of the arc of curvature in upward direction as shown in Figure 1. The ball bearing supports comprise a ring or inner race member 3a secured to the fixed shaft 1 and a ring or outer race member 3b which engages the interior of the tube 2 by means of another ring or spider 3c, the outer surface of which is slightly curved and consists of a ring member 3d of flexible material. The tube 2 is equipped with transversely disposed pairs of incisions 8 and 8a equally spaced apart and disposed in such manner that each pair of adjacent incisions is spaced apart 90° from the other pair. A sleeve 4 of flexible material is held in place on the tube 2 by ring members 9 and the tube 2 itself engages at its end drum-like members 10 mounted by means of ball bearings 10a on the fixed shaft 1.

The fixed shaft 1 is further equipped with a longitudinally disposed slot 11 in which a draw bolt 12 is disposed. The ends of the bolt 12 are threaded and carry the nuts 13 and have bolt-holding caps 13a interposed between the nuts and the corresponding ends of the shaft. The draw bolt 12 extends along the entire useful length of the fixed shaft 1. Upon tightening the nuts 13 the length of the bolt 12 is shortened which necessarily brings about a change in the curvature of the fixed shaft 1 and of the smoothing roll supported thereby. The ring members 3a maintain the draw bolt 12 in the slot 11 regardless of the degree of curvature achieved. This curvature may be obtained easily due to the great flexibility of the fixed shaft 1 which is equipped with the incisions 7 and of the tube 2 which is equipped with the incisions 8 and 8a, respectively.

The above novel smoothing and contracting roll is distinguished by the great simplicity of its concept and consequently by its relatively low manufacturing costs. Its function is at least equivalent if not superior to the known rolls. The curvature of the roll can be easily regulated in accordance with the requirements.

While I have disclosed one embodiment of the present invention, it is to be understood that this embodiment is given by example only and not in a limiting sense, the scope of the present invention being determined by the objects and the claims.

I claim:

1. A smoothing or contracting roll comprising a metal bar adapted to form a fixed shaft, a flexible one-piece tube surrounding said shaft, a plurality of ball bearings spaced apart from each other and disposed between said shaft and said tube, and a sleeve of resilient material mounted on said tube, said shaft having a longitudinally disposed slot extending over its entire length, and a draw bolt received by said slot, said bolt being threaded at its end portions, and nuts received by said end portions and abutting the ends of said shaft in order to modify the curvature of the arc formed by said shaft.

2. A smoothing and contracting roll for flexible sheet material, comprising an axial shaft having a curved resiliently flexible central portion, a one-piece transversely slotted flexible metal tube encircling said shaft, ball bearings mounted on said shaft and spaced longitudinally thereof within and supporting said flexible tube, and a flexible surface sleeve snugly fitted over said flexible tube to rotate therewith, there being a longitudinal slot in an opening through the surface of said shaft, a draw bolt disposed in said slot and having a nut threaded on each end thereof and abuttingly related to the corresponding end of said shaft whereby tightening of said nuts will modify the longitudinal curvature of the shaft.

References Cited in the file of this patent

UNITED STATES PATENTS

| | | |
|---|---|---|
| 1,776,382 | Farrell | Sept. 23, 1930 |
| 2,171,185 | Maier | Aug. 29, 1939 |
| 2,436,719 | Hurxthal | Feb. 24, 1948 |
| 2,445,638 | Saks | July 20, 1948 |
| 2,582,280 | Robertson | Jan. 15, 1952 |
| 2,630,897 | Porter | Mar. 10, 1953 |

FOREIGN PATENTS

| | | |
|---|---|---|
| 260,172 | Great Britain | Oct. 28, 1926 |
| 656,033 | Germany | Jan. 27, 1938 |